April 19, 1949.  P. L. TAYLOR  2,467,542
ARC EXTINGUISHING DEVICE
Filed June 2, 1945  4 Sheets-Sheet 2
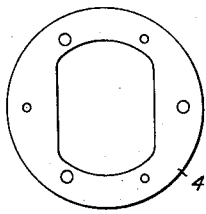 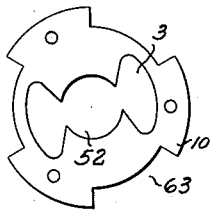 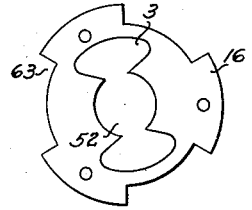 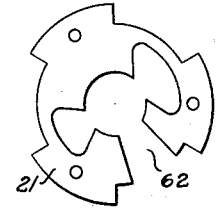
Fig. 4   Fig. 10   Fig. 16   Fig. 21
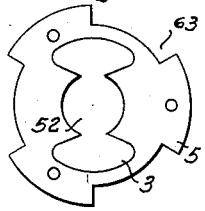 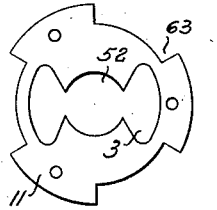 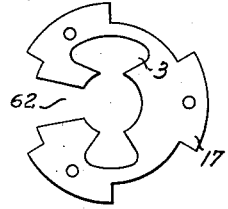 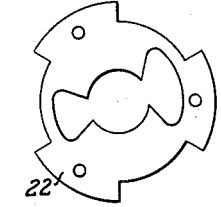
Fig. 5   Fig. 11   Fig. 17   Fig. 22
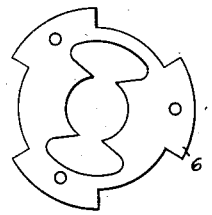 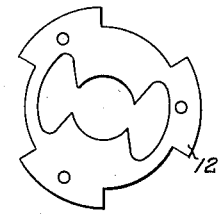 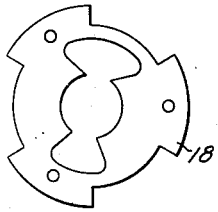 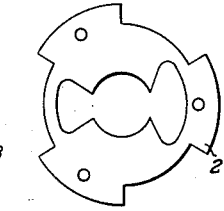
Fig. 6   Fig. 12   Fig. 18   Fig. 23
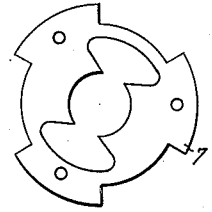 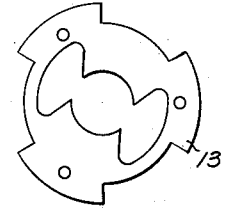 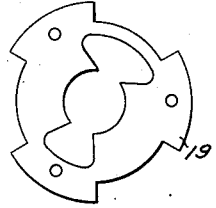 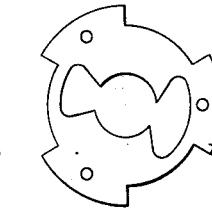
Fig. 7   Fig. 13   Fig. 19   Fig. 24
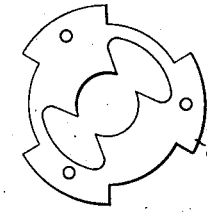 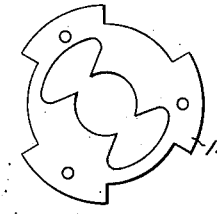 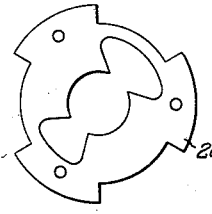 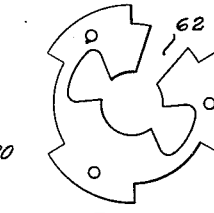
Fig. 8   Fig. 14   Fig. 20   Fig. 25
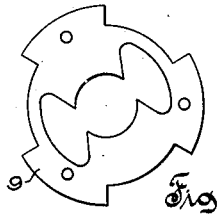 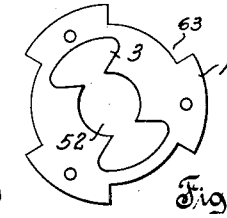
Fig. 9   Fig. 15
Inventor
Philip L. Taylor
by Harold S. Silver
Attorney April 19, 1949.   P. L. TAYLOR   2,467,542
ARC EXTINGUISHING DEVICE
Filed June 2, 1945   4 Sheets-Sheet 3

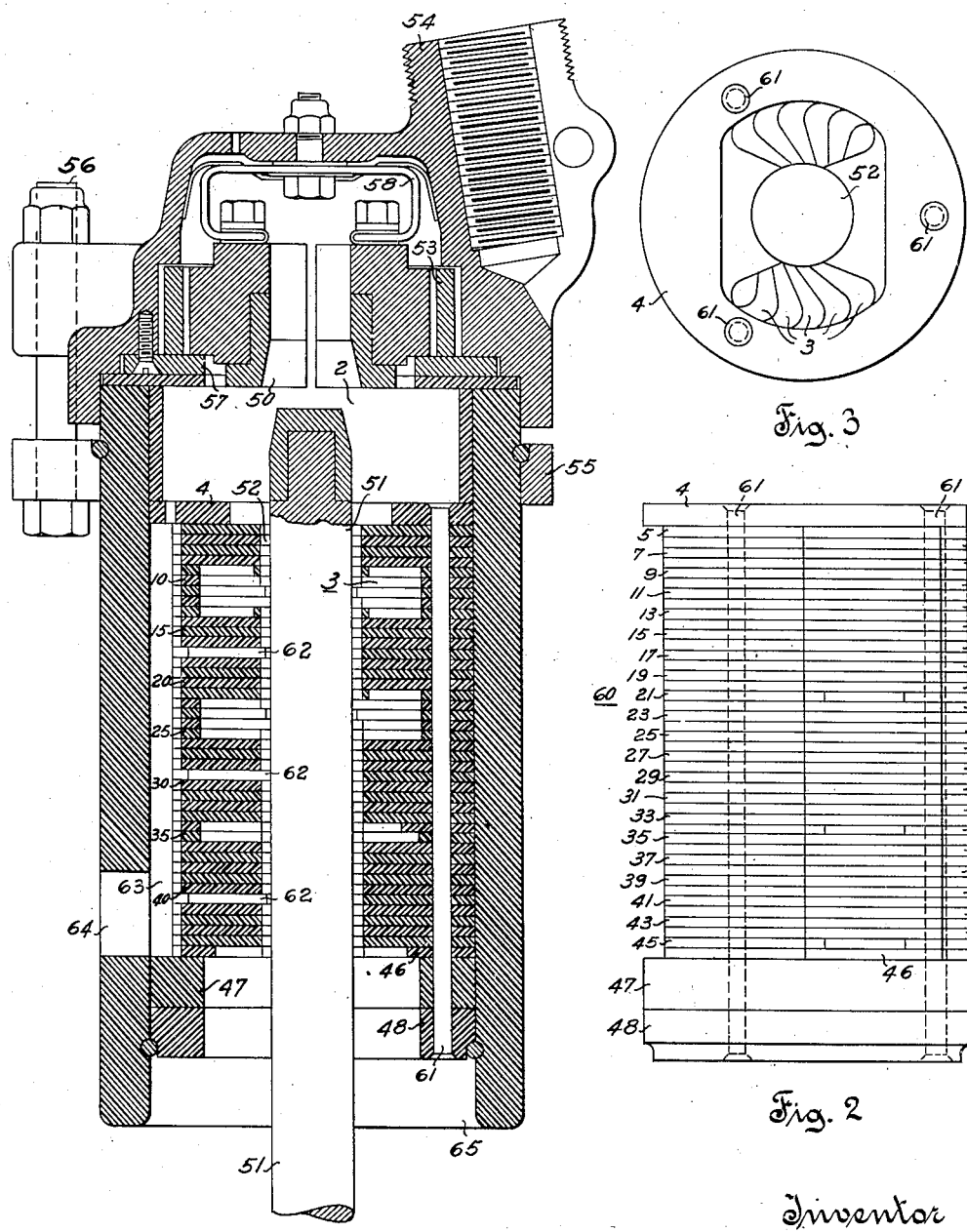

Inventor
Philip L. Taylor
by Harold S. Silver
Attorney

Patented Apr. 19, 1949

2,467,542

UNITED STATES PATENT OFFICE 2,467,542

ARC EXTINGUISHING DEVICE

Philip L. Taylor, Abington, Mass., assignor to Allis-Chalmers Manufacturing Company, Milwaukee, Wis., a corporation of Delaware Application June 2, 1945, Serial No. 597,298

12 Claims. (Cl. 200—150)

This invention relates in general to circuit breakers of the type wherein the arc or arcs formed during interruption are extinguished in oil or some similar insulating or arc extinguishing fluid and relates more particularly to an improvement of a circuit breaker of the above type, such as is shown in U. S. 2,109,685, C. D. Ainsworth, March 1, 1938, Circuit breaker, whereby a more rapid and more efficient arc interruption is obtained.

It is an object of the present invention to provide an improved circuit breaker of the above type wherein the energetic products of arcing are prevented from acting adversely on the un-ionized arc extinguishing fluid utilized for extinguishing the arc.

It is also an object of the present invention to provide an improved circuit breaker of the above type wherein relatively un-ionized arc extinguishing fluid is forcibly impelled into the arcing region along one or more progressively developing fronts.

It is also an object of the present invention to provide an improved circuit breaker of the above type with one or more helical passages surrounding the arcing region, which helical passages have a progressively decreasing cross-section as the passage extends from the region of arc initiation.

It is also an object of this invention to provide an improved circuit breaker of the above type in which helical passages surround the arcing region and in which the products of arcing are vented from the arcing region without adverse reaction on the arc extinguishing fluid in the helical passageways.

It is also an object of the present invention to provide an improved circuit breaker in which a separate pressure generating arc is utilized in a manner to enhance the arc extinguishing action in circuit breakers of the types above referred to.

Objects and advantages other than those above set forth will be apparent from the following description when read in connection with the accompanying drawing, in which:

Fig. 1 is a section view through an arc interrupting device embodying the present invention;

Fig. 2 is an elevational view of the disk assembly shown in the device of Fig. 1;

Fig. 3 is a top view of the disk assembly shown in Fig. 2;

Figure 26:
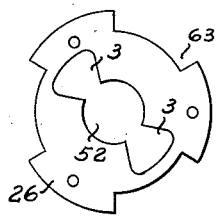
Figure 32:
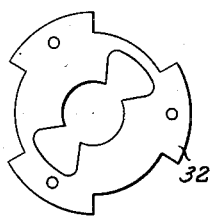
Figure 38:
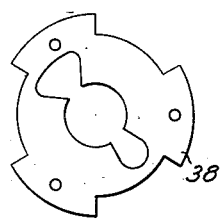
Figure 43:
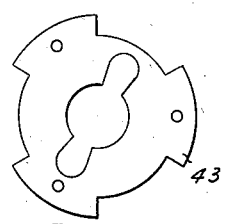
Figure 27:
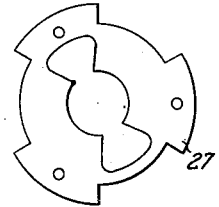
Figure 33:
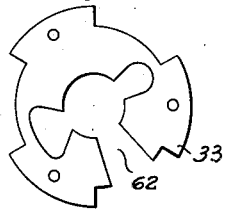
Figure 39:
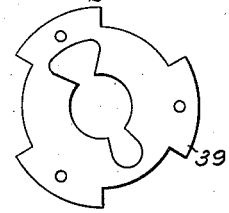
Figure 44:
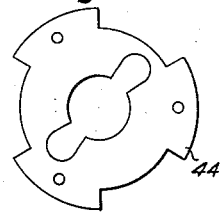
Figure 28:
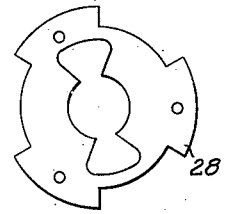
Figure 34:
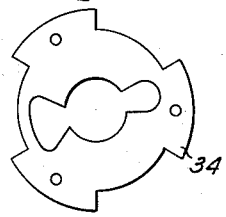
Figure 40:
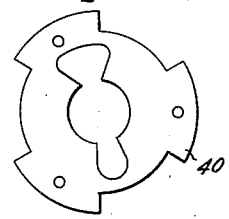
Figure 45:
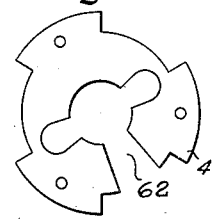
Figure 29:
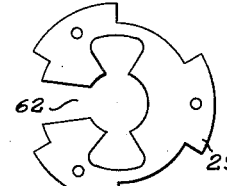
Figure 35:
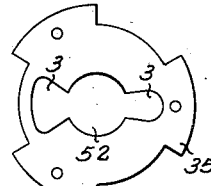
Figure 41:
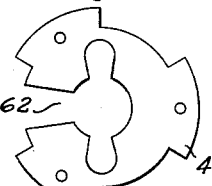
Figure 46:
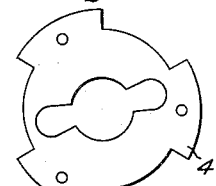
Figure 30:
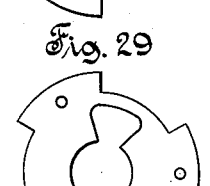
Figure 36:
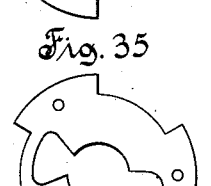
Figure 42:
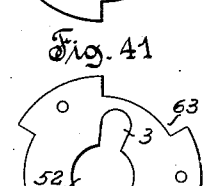
Figure 47:
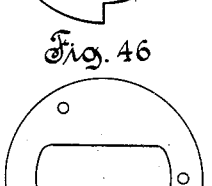
Figure 31:
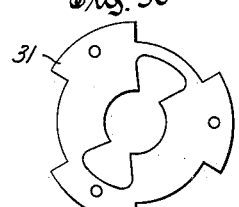
Figure 37:
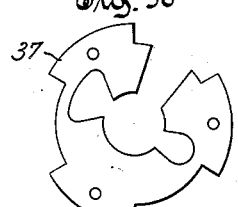
Figure 48:
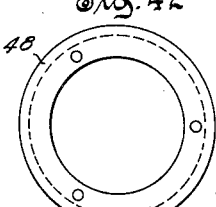
Figure 49:
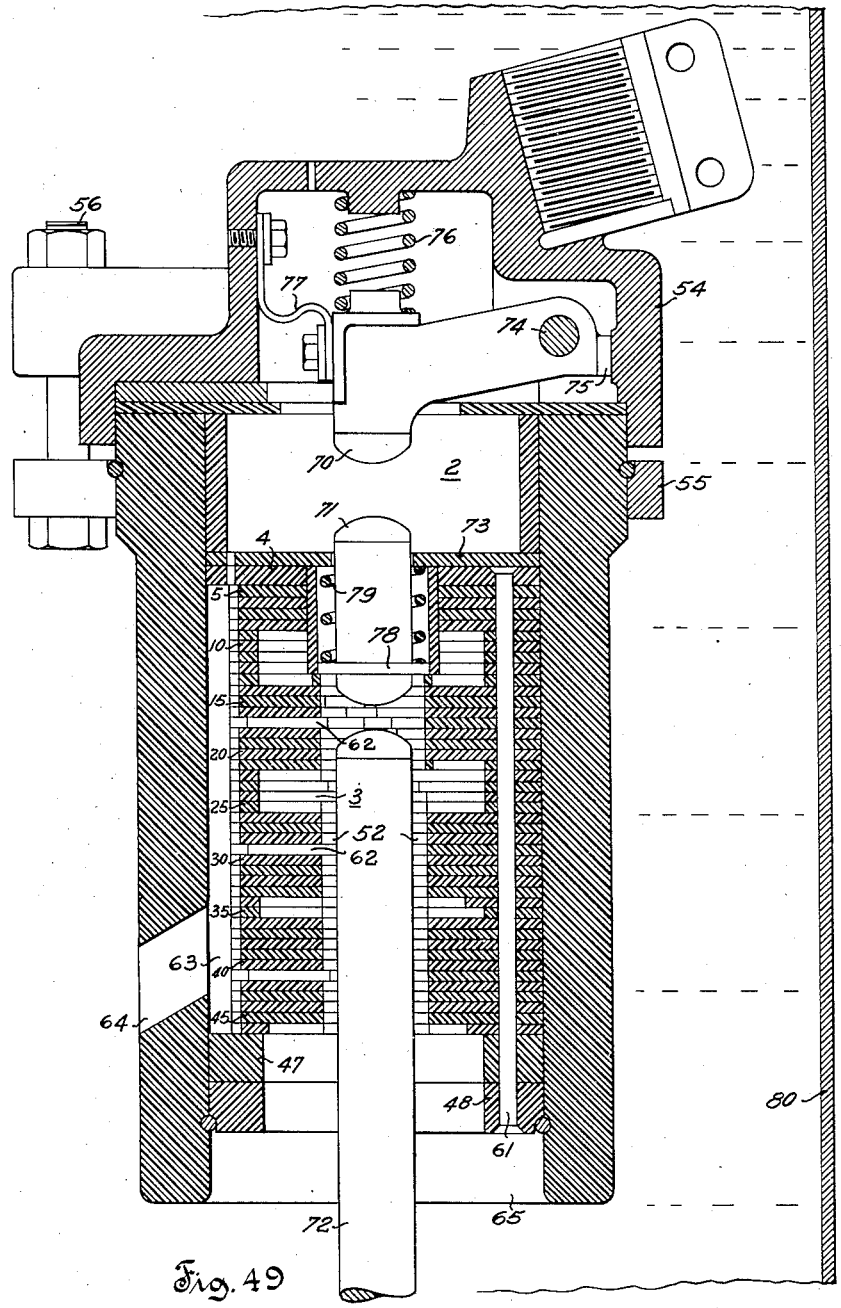

Figs. 4 to 48, inclusive, are detailed views of the disks forming the assembly shown in Figs. 1, 2 and 3; and Fig. 49 is a view of an arc interrupting device illustrating a modification of the invention shown in Fig. 1.

The arc interrupting device shown in Fig. 1 comprises generally a fixed contact 50, a movable contact 51, a contact passageway 52, a pressure chamber 2, and a disk assembly 60 in which are formed one or more passageways 3 of progressively decreasing cross-sectional area opening into the contact passageway 52. The arc interrupting device of Fig. 1 is arranged to be immersed in oil or a similar insulating or arc extinguishing fluid in a casing 80, as shown in connection with the modification of Fig. 49.

In the embodiment illustrated in Fig. 1, the fixed contact 50 is formed of a plurality of segments which are supported by a supporting ring 53. Radial springs (not shown) between each segment of the fixed contact 50 and the supporting ring 53 bias the contact segments to provide contact pressure for the movable contact 51. The segments of the fixed contact 50 are electrically connected to the main supporting casting 54 in a suitable manner as by means of shunts 58. The fixed contact assembly is supported in the supporting casting 54 by means of a retaining ring 57 rigidly fastened to the supporting casting 54.

An assembly of disks, shown separately in Figs. 2 and 3, is supported in a casing 65 which is held in the supporting casting 54 by means of a clamping ring 55 and clamping bolts 56. The supporting casting 54 is formed for attachment to the usual current carrying stud (not shown) entering a switch casing such as 80 through a bushing (not shown). Usually, interrupting devices such as shown in Fig. 1 are supported in the switch casing so that a double break is obtained by movement of movable contacts 51, which contacts are generally joined by a conductive bridging member and are operated by an operator, neither of which is shown in the present drawing.

The disk assembly 60 is spaced from the fixed contact so as to form a pressure generating chamber 2 adjacent the region of arc initiation. The disk assembly 60 has a central aperture forming a contact passageway 52 through which the contact 51 moves to open and close the circuit. Surrounding the contact passageway 52 are multiple helical passageways beginning at the pressure chamber 2 and extending through the disk assembly 60 to the space external of the casing 65. These helical passageways are shown as formed by means of the disks 4 to 48 which are shown respectively in Figs. 4 to 48. The disks 5 to 46 have cut out portions extending from the central aperture forming the contact passageway 52, in the general manner of a clover leaf, with the openings into the passageway 3 being of a width less than the width of the passageway 3.

To clarify the disclosure as to these helical passageways, the disks 4 to 48 are numbered consecutively as shown in Fig. 2 and Figs. 4 to 48 are shown consecutively in the drawings. The disks in Fig. 2 are the same as the disks in Fig. 1 on the same level as viewed in the drawing. Each disk has three small apertures through which fastening members 61 extend and hold the assembled disks in proper relation. Disks 5 to 46 each have three sectors cut out of the periphery thereof, which sectors are alined in the stack to form longitudinal venting passageways 63, one of which is shown in Figs. 1 and 49. As the contact passageway 52 extends downward from the pressure chamber 2, vents 62 from the contact passageway 52 to the longitudinal venting passageways 63 are provided at intervals as shown in Figs. 1 and 49, and as shown in more detail in Figs. 17, 21, 25, 29, 33, 41 and 45.

As the helical passageways extend from the pressure chamber 2, these passageways decrease in cross-section. This is apparent from the decreasing number of disks utilized in forming the longitudinal dimension of the passageways 3 as shown in Figs. 1 and 49, and as further shown by the decrease in the cross-section of the apertures forming the helical passageway 3 as such passageway progresses downward. For example, beginning with disk 17, one helical passageway is of diminished cross-section; beginning with disk 25, the other helical passageway is of diminished cross-section; and, similarly, beginning with disks 33 and 41 further diminishing of cross-section is effected. The longitudinal venting passageways 63 are each vented at the lower end thereof through three separate ports 64, one of which is apparent in Figs. 1 and 49.

The showing of Fig. 1 illustrates the preferred form of the present invention, in which the passageways 3 are concentric of the contact passageway 52, and are of stepped decreasing cross section. These passageways 3, as subsequently further described, in conjunction with arc pressure, impel and divert liquid into the arc along the length of the arc drawn in the contact passageway 52. While Fig. 1 illustrates but two such passageways arranged in a concentric helix around the contact passageway 52, such showing is merely illustrative of the preferred embodiment, for the number of the passageways, the length, cross section, and the change in cross section per unit length, and the pitch, pitch diameter, and concentricity of the helical passageways may be varied by the designer, dependent upon current and voltage conditions and the type of service for which any particular circuit breaker is to be used.

Operation of the embodiment illustrated in Fig. 1 is as follows. Downward movement of the movable contact 51 draws an arc between such contact and the fixed contact 50 in the pressure generating chamber 2. The arc breaks down a portion of the arc extinguishing liquid, thereby generating a pressure which is immediately transmitted to the columns of liquid in the helical passages 3. The cross-section and pitch of the helical passages 3 are selected to give a relatively low flow resistance to the column of liquid and, therefore, the pressure exerted from the pressure chamber on the top of the liquid column, forces a stream of liquid rapidly down each helical passageway 3. The stepped reduction in volume of the helical passageways 3 results in a positive and continuous diversion of liquid from each of the columns into the contact passageway 52 throughout its effective length.

The shape and volume of the helical passageways 3 and the proportioning of the openings from the helical passageways 3 into the contact passage 52 are such as to deter the products of combustion from entering the helical passageways 3 and adversely reacting on the liquid therein. The particular construction of the helical passageway 3 affords exposure of only a limited quantity of the fluid in the passageways to the arc in the contact passageway 52. For the purposes of explanation, the configuration of the liquid in the passageway 3 may be considered to be substantially in the form of a helical wedge with the upper or driving surface of the wedge exposed to the liquid in the pressure generating chamber 2, and the apex portion of the wedge extending into the openings in the disks 47, 48. Pressure exerted from the pressure generating chamber 2 upon the upper portion of the wedge-shaped column of liquid in the passageway 3 will force the wedge of liquid downward along the tapering passageway 3. As the column of liquid moves downward the walls of the passageways 3 react on it so as to force those portions of the liquid adjacent to the contact passageway 52 into the arc contained therein along the entire length of the arc, with the result that the arc is exposed to a progressively developing front of substantially un-contaminated and un-ionized liquid. Thus, relatively un-ionized liquid is continuously, progressively and forcibly delivered along two continuous and progressively developing helical fronts and is forcibly impelled into the arc as it is extended in the contact passageway 52.

At various intervals, the excess ionized gas in the arcing region in the contact passageway 52 is vented through the vents 62, 63 and ports 64 to the space outside of the casing 65, where it is dispersed without mixing such ionized gases with the liquid in the helical passageways 3 that is utilized for arc extinguishment.

The present invention as embodied in the device of Fig. 1, therefore, provides a unique and highly effective multiple front helical impulsion of fresh liquid into the arc from all angles and elevations as the arc is extended in the contact passageway 52. This all-over attack is started at the earliest effective time and continues throughout existence of the arc. This arc extinguishing action is effected not only from all angles and all elevations but also by various arc extinguishing action including turbulence, displacement, diffusion, dilution and ion recombination. The configuration and relative positioning of the passageways 3, as above described, is such as to effectively maintain the integrity of the liquid in said passageways and to provide for the diversion of the liquid into the passageway 52 when pressure is exerted on the top of the column of liquid in the passageways 3. Further, the openings 62 provide for side evacuation of the contaminated liquid and arc products from the arcing region in the passageway 52 to the space outside of the arc extinguishing device.

In the modification shown in Fig. 49 the disk assembly 60 is substantially similar to that shown in Figs. 1, 2 and 3 with the helical passageways similarly formed. In the embodiment shown in Fig. 49, a series arc is utilized to enhance the effects of an arc extinguishing device such as is shown in Fig. 1. In the device of Fig. 49, one arc is drawn in the pressure chamber 2 and is utilized primarily to generate pressure that is exerted on the top of the column of arc extinguishing fluid in the helical passageways 3.

The pressure generating arc is drawn in the pressure generating chamber 2 and between relatively movable contacts 70 and 71. The contact 70 is shown as movable about a pivot 74 and biased to the position shown by a spring 76 which, in the position shown, presses a stop member 75 against an abutment on the supporting casting 54. A flexible connecting pigtail 77 provides a good conductive connection from the casting 54 to the contact 70.

An intermediate contact 71 is biased downward by a spring 79. The lower end of contact 71 cooperates with a movable contact 72 to draw an arc in the passageway 52 which arc is extended by movement of the contact 72 down the passageway 52. A guiding member on the contact 71 effectually closes off the contact passageway 52 from the pressure chamber 2, so that the pressure generating arc drawn between the contacts 70 and 71 is isolated from the arc drawn between contacts 71 and 72, and, therefore, the products of arcing at the pressure generating arc cannot adversely interfere with extinguishing of the arc in the passageway 52.

The helical passageways formed in the disk assembly 60 in the embodiment of Fig. 49 are similar to those formed in the embodiment shown in Fig. 1, and insulating fluid from the pressure chamber 2 is forced through such passageways and is forcibly impelled into the arcing region of the arc drawn between contacts 72 and 71.

As shown in Fig. 49, the switch contacts are in the partially open position. Upward movement of contact 72 closes contacts 71 and 72, which contacts are moved upward together as a unit until contact 71 makes with contact 70. Contact pressure is maintained by the operating means (not shown) and the spring 76. The breaker is now closed.

To open the breaker, the contact 72 is moved downward, the contacts 71 and 72 again moving as a unit until the stop 75 reaches the abutment on the casting 54, at which time the contact 70 stops in the position shown. As the contacts 72 and 71 continue downward movement, an arc is drawn between the contacts 70 and 71 in the pressure generating chamber 2. The pressure generated by this arc is exerted on the columns of liquid in the helical passageways 3. Further downward movement of the contact 72 permits downward movement of the contact 71 until the guide member 78 stops against the disk 13, and additional downward movement of the contact 72 draws an arc between contacts 71 and 72, which arc is extended in the contact passageways 52 by further downward movement of the contact 72. The products of arcing at the pressure generating arc in the pressure generating chamber 2 are isolated from the arc drawn between contacts 71 and 72. Further action of the liquid in the helical passages to extinguish the arc between the contacts 71 and 72 is similar to that above described in connection with the embodiment shown in Fig. 1.

The showing in Fig. 49 is illustrative, and the passageway or passageways of progressively varying cross-sectional area may be provided in various ways as described in connection with the embodiment of Fig. 1. Additional ports 64 may be desirable in the embodiment of Fig. 49 and other arrangements of the contacts may be provided to obtain different timing in the opening of the upper and lower contacts.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In a circuit breaker: an arc extinguishing device immersed in arc extinguishing fluid; a pressure generating chamber in said device; a contact passageway extending through said device from said pressure generating chamber to a space external of said device; means for drawing an arc in said pressure generating chamber, said means comprising relatively movable contacts one of which is withdrawable through said contact passageway to extend said arc; said contact passageway being defined by a wall structure extending generally longitudinally of and partially circumferentially surrounding the common axis of said contacts; a second wall structure defining at least one fluid confining passageway of progressively varying transverse cross-sectional area, the axis of said fluid confining passageway being spaced laterally from the axis of said contact passageway; said fluid confining passageway extending generally longitudinally of the axis of said contact passageway from said pressure generating chamber along at least a portion of the length of said contact passageway; and said wall structures providing a common opening for the flow of fluid from said fluid confining passageway to said contact passageway, said opening extending along at least a portion of the length of said passageways.

2. In a circuit breaker: an arc extinguishing device immersed in arc extinguishing fluid; a pressure generating chamber in said device; a contact passageway extending through said device from said pressure generating chamber to a space external of said device; means for drawing an arc in said pressure generating chamber, said means comprising relatively movable contacts one of which is withdrawable through said contact passageway to extend said arc; said contact passageway being defined by a wall structure extending generally longitudinally of and partially circumferentially surrounding the common axis of said contacts; a second wall structure defining at least one fluid confining passageway of progressively decreasing transverse cross-sectional area, the axis of said fluid confining passageway being spaced laterally from the axis of said contact passageway; said fluid confining passageway extending generally longitudinally of the axis of said contact passageway from said pressure generating chamber along at least a portion of the length of said contact passageway; and said wall structures providing a common opening for the flow of fluid from said fluid confining passageway to said contact passageway, said opening extending along at least a portion of the length of said passageways.

3. In a circuit breaker: an arc extinguishing device immersed in arc extinguishing fluid, a pressure generating chamber in said device; a contact passageway extending through said device from said pressure generating chamber to a space external of said device: means for drawing an arc in said pressure generating chamber, said means comprising relatively movable contacts one of which is withdrawable through said contact passageway to extend said arc; said contact passageway being defined by a wall structure extending generally longitudinally of and partially circumferentially surrounding the common axis of said contacts; a second wall structure defining at least one helical fluid confining passageway of progressively varying transverse cross-sectional area surrounding said contact passageway and extending generally longitudinally of the axis of said contact passageway from said pressure generating chamber along at least a portion of the length of said contact passageway; and said wall structures providing a common opening for the flow of fluid from said fluid confining passageway to said contact passageway, said opening extending along at least a portion of the length of said passageways.

4. In a circuit breaker: an arc extinguishing device immersed in arc extinguishing fluid; a pressure generating chamber in said device; a contact passageway extending through said device from said pressure generating chamber to a space external of said device; means for drawing an arc in said pressure generating chamber, said means comprising relatively movable contacts one of which is withdrawable through said contact passageway to extend said arc; said contact passageway being defined by a wall structure extending generally longitudinally of and partially circumferentially surrounding the common axis of said contacts; a second wall structure defining at least one helical fluid confining passageway of progressively decreasing transverse cross-sectional area surrounding said contact passageway and extending generally longitudinally of the axis of said contact passageway from said pressure generating chamber along at least a portion of the length of said contact passageway, and said wall structures providing a common opening for the flow of fluid from said fluid confining passageway to said contact passageway, said opening extending along at least a portion of the length of said passageways.

5. In a circuit breaker: an arc extinguishing device immersed in arc extinguishing fluid, a pressure generating chamber in said device; a contact passageway extending through said device from said pressure generating chamber to a space external of said device; means for drawing an arc in said pressure generating chamber, said means comprising relatively movable contacts one of which is withdrawable through said contact passageway to extend said arc; said contact passageway being defined by a wall structure extending generally longitudinally of and partially circumferentially surrounding the common axis of said contacts; a second wall structure defining at least one fluid confining passageway of progressively varying transverse cross-sectional area, the axis of said fluid confining passageway being spaced laterally from the axis of said contact passageway; said fluid confining passageway extending generally longitudinally of the axis of said contact passageway from said pressure generating chamber along at least a portion of the length of said contact passageway; said wall structures providing a common opening for the flow of fluid from said fluid confining passageway to said contact passageway, said opening extending along at least a portion of the length of said passageways; and means along the length of said contact passageway for venting the products of arcing to a space external of said device, said venting means comprising an opening in said contact passageway remote from said fluid confining passageway.

6. In a circuit breaker: an arc extinguishing device immersed in arc extinguishing liquid; a pressure generating chamber in said device; a contact passageway extending through said device from said pressure generating chamber to a space external of said device; means for drawing an arc in said pressure generating chamber, said means comprising relatively movable contacts one of which is withdrawable through said contact passageway to extend said arc; said contact passageway being defined by a wall structure extending generally longitudinally of and partially circumferentially surrounding the common axis of said contacts; a second wall structure defining at least one fluid confining passageway of progressively varying transverse cross-sectional area, the axis of said fluid confining passageway being spaced laterally from the axis of said contact passageway; said fluid confining passageway extending generally longitudinally of the axis of said contact passageway from said pressure generating chamber along at least a portion of said contact passageway; said wall structures providing a common opening for the flow of fluid from said fluid confining passageway to said contact passageway, said opening extending along at least a portion of the length of said passageway and having a transverse width less than the maximum width of said fluid confining passageway.

7. In a circuit breaker: an arc extinguishing device immersed in arc extinguishing liquid; a pressure generating chamber in said device; a contact passageway extending through said device from said pressure generating chamber to a space external of said device; means for drawing an arc in said pressure generating chamber, said means comprising relatively movable contacts one of which is withdrawable through said contact passageway to extend said arc; said contact passageway being defined by a wall structure extending generally longitudinally of and partially circumferentially surrounding the common axis of said contacts; a second wall structure defining at least one fluid confining passageway of progressively varying transverse cross-sectional area, the axis of said fluid confining passageway being spaced laterally from the axis of said contact passageway; said fluid confining passageway extending generally longitudinally of the axis of said contact passageway from said pressure generating chamber along at least a portion of said contact passageway, said wall structures providing a common opening for the flow of fluid from said fluid confining passageway to said contact passageway, said opening extending along at least a portion of the length of said passageway and having a transverse width less than the maximum width of said fluid confining passageway; and means along the length of said contact passageway for venting the products of arcing to a space external of said device, said venting means comprising an opening in said contact passageway remote from said fluid confining passageway.

8. In a circuit breaker: an arc extinguishing device immersed in arc extinguishing liquid; a pressure generating chamber in said device; a contact passageway extending through said device from said pressure generating chamber to a space external of said device; means for drawing an arc in said pressure generating chamber, said means comprising relatively movable contacts one of which is withdrawable through said contact passageway to extend said arc; said contact passageway being defined by a wall structure extending generally longitudinally of and partially circumferentially surrounding the common axis of said contacts; a second wall structure defining at least one helical fluid confining passageway surrounding said contact passageway and extending from said pressure generating chamber along at least a portion of said contact passageway; said wall structures providing a common opening for the flow of fluid from said fluid confining passageway to said contact passageway, said opening extending along at least a portion of the length of said passageway, and means along the length of said contact passageway for venting the products of arcing to a space external of said device, said venting means comprising an opening in said contact passageway remote from said helical passageway.

9. In a circuit breaker: an arc extinguishing device immersed in arc extinguishing liquid; a pressure generating chamber in said device; a contact passageway extending through said device from said pressure generating chamber to a space external of said device; means for drawing an arc in said pressure generating chamber, said means comprising relatively movable contacts one of which is withdrawable through said contact passageway to extend said arc; said contact passageway being defined by a wall structure extending generally longitudinally of and partially circumferentially surrounding the common axis of said contacts; a second wall structure defining at least one helical fluid confining passageway surrounding said contact passageway and extending from said pressure generating chamber along at least a portion of said contact passageway, said wall structures providing a common opening for the flow of fluid from said fluid confining passageway to said contact passageway, said opening extending along at least a portion of the length of said passageway and having a transverse width less than the maximum width of said helical passageway.

10. In a circuit breaker: an arc extinguishing device immersed in arc extinguishing liquid; a pressure generating chamber in said device; a contact passageway extending through said device from said pressure generating chamber to a space external of said device; means for drawing an arc in said pressure generating chamber, said means comprising relatively movable contacts one of which is withdrawable through said contact passageway to extend said arc; said contact passageway being defined by a wall structure extending generally longitudinally of and partially circumferentially surrounding the common axis of said contacts; a second wall structure defining at least one helical fluid confining passageway surrounding said contact passageway and extending from said pressure generating chamber along at least a portion of said contact passageway; said wall structures providing an opening for the flow of fluid from said fluid confining passageway to said contact passageway, said opening extending along at least a portion of the length of said passageway and having a transverse width less than the maximum width of said helical passageway, and means along the length of said contact passageway for venting the products of arcing to a space external of said device, said venting means comprising an opening in said contact passageway remote from said helical passageway.

11. In a circuit breaker: an arc extinguishing device immersed in arc extinguishing liquid, a pressure generating chamber in said device, a contact passageway extending through said device from said pressure generating chamber to a space external of said device, means for drawing an arc in said pressure generating chamber, said means comprising relatively movable contacts one of which is generally cylindrical and withdrawable through said contact passageway to extend said arc, said contact passageway being defined by generally cylindrical wall structure extending generally longitudinally of and partially circumferentially surrounding the common axis of said contacts, a second wall structure defining at least one fluid confining passageway of progressively varying transverse cross-sectional area, the axis of said fluid confining passageway being spaced laterally from the axis of said contact passageway; said fluid confining passageway extending generally longitudinally of the axis of said contact passageway from said pressure generating chamber along at least a portion of said contact passageway, said wall structures providing a common opening for the flow of fluid from said fluid confining passageway to said contact passageway, said opening extending along at least a portion of the length of said passageway.

12. In a circuit breaker: an arc extinguishing device immersed in arc extinguishing fluid; a pressure generating chamber in said device; a contact passageway extending through said device from said pressure generating chamber to a space external of said device; means for drawing a first arc in said pressure generating chamber, said means comprising relatively movable contacts one of which substantially closes the end of said contact passageway adjacent said pressure chamber; a second movable contact cooperable with said one of said movable contacts to draw a second arc in said contact passageway; said contact passageway being defined by a wall structure extending generally longitudinally of and partially circumferentially surrounding the common axis of said contacts; a second wall structure defining at least one fluid confining passageway of progressively varying transverse cross-sectional area, the axis of said fluid confining passageway being spaced laterally from the axis of said contact passageway; said fluid confining passageway extending generally longitudinally of the axis of said contact passageway from said pressure generating chamber along at least a portion of the length of said contact passageway; and said wall structures providing a common opening for the flow of fluid from said fluid confining passageway to said contact passageway, said opening extending along at least a portion of the length of said passageways.

PHILIP L. TAYLOR.

REFERENCES CITED

The following references are of record in the file of this patent:

UNITED STATES PATENTS

| Number | Name | Date |
|---|---|---|
| 1,849,875 | Kees | Mar. 15, 1932 |
| 1,899,612 | Dyer | Feb. 28, 1933 |
| 1,981,404 | Whitney et al. | Nov. 20, 1934 |
| 1,981,709 | Rawlins | Nov. 20, 1934 |
| 2,075,749 | Paul | Mar. 30, 1937 |
| 2,109,685 | Ainsworth | Mar. 1, 1938 |
| 2,156,663 | Cole | May 2, 1939 |
| 2,372,589 | Leeds et al. | Mar. 27, 1945 |
| 2,385,008 | Leeds et al. | Sept. 18, 1945 |